Nov. 14, 1944.  W. R. SPILLER  2,362,592
OVERLOAD RELEASE
Filed May 8, 1941   2 Sheets-Sheet 1

INVENTOR.
WILLIAM R. SPILLER.
BY Mareshal Moe
ATTORNEYS

Nov. 14, 1944.   W. R. SPILLER   2,362,592
OVERLOAD RELEASE
Filed May 8, 1941   2 Sheets-Sheet 2
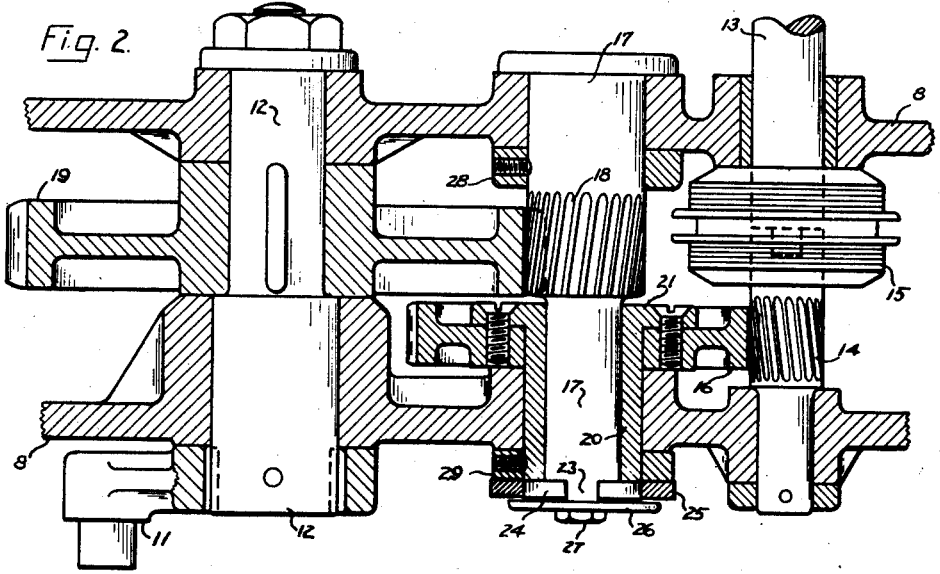
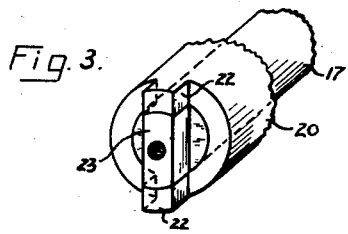
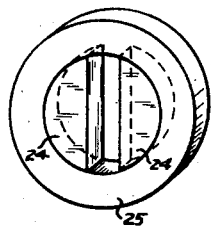
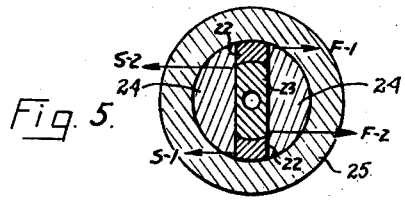
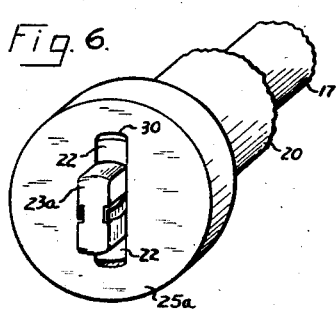
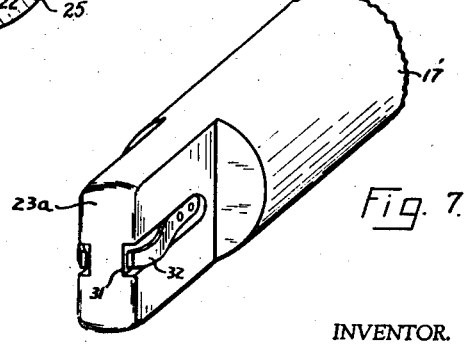
INVENTOR.
WILLIAM R. SPILLER.
BY
ATTORNEYS Patented Nov. 14, 1944

2,362,592

UNITED STATES PATENT OFFICE 2,362,592

OVERLOAD RELEASE

William R. Spiller, Dayton, Ohio, assignor to Harris-Seybold-Potter Company, Cleveland, Ohio, a corporation of Ohio Application May 8, 1941, Serial No. 392,592

10 Claims. (Cl. 64—28)

This invention relates to improvements in devices for overload prevention in power machinery such as a paper cutter and more especially to the type wherein a breakable element is interposed in the train of power transmission members so as to prevent the destruction of other more important and expensive parts in case of overloading.

While the invention is suitable for use in various applications and with different specific types of apparatus, it has been particularly constructed and adapted for use with paper cutting machinery and for purposes of illustration, will be described hereinafter more particularly in that relation. In previous devices of this nature there have been attendant disadvantages, such for instance as the marring of engaging parts when a shear pin construction is utilized and the pins are sheared off; in the case of grooved washers as shown in the Seybold Patent 1,207,227, the breaking load is a combined stress of bending and tension which causes the fracture to take place at varying locations and to some extent is influenced by the tightness of the retaining screw making it difficult to predetermine with accuracy the load at which fracture will occur. Other devices of the friction release type do not always provide a complete disconnecting action which is desired in many cases.

It is accordingly the principal object of the invention to provide a load limiting device for use in connection with drive mechanism of the character described which is simple and inexpensive in construction and which provides a complete release in the drive train when the load exceeds a definite and predetermined value without marring or damaging of any of the working parts of the mechanism and without causing objectionable noise after the power has been disconnected.

It is a further object to provide a load limiting device incorporating a readily and cheaply replaceable frangible element which is of regular shape and is substantially free of stress raisers due to internal sharp corners, odd shapes or the like.

Another object is to provide such a device wherein the forces of rupture are made effective substantially entirely to cause purely tensile stresses in a section of predetermined and regular cross section so that by regulating such section, the limiting load can be accurately predetermined.

A still further object is to provide a load limiting device in which the parts associated with the frangible element merely drop out of the way upon its rupture and may be easily reassembled with a new frangible member without requiring special tools for replacement.

Other objects and advantages of the invention will be apparent from the following description, the accompanying drawings, and the appended claims.

In the drawings:

Fig. 2 is a sectional plan view on a larger scale of a portion of the paper cutting machine showing the present invention in operative position;

Fig. 3 is a perspective detail view of the driving and driven members;

Fig. 4 is a perspective detailed view of the torque transmitting elements and the frangible element;

Fig. 5 is a diagrammatic representation of the forces involved when power is applied and showing a vertical sectional view through the torque transmitting parts;

Fig. 6 is an enlarged perspective assembly view of a modified form of the invention; and Fig. 7 is an enlarged perspective view of the modified drive member.

Figure 1:
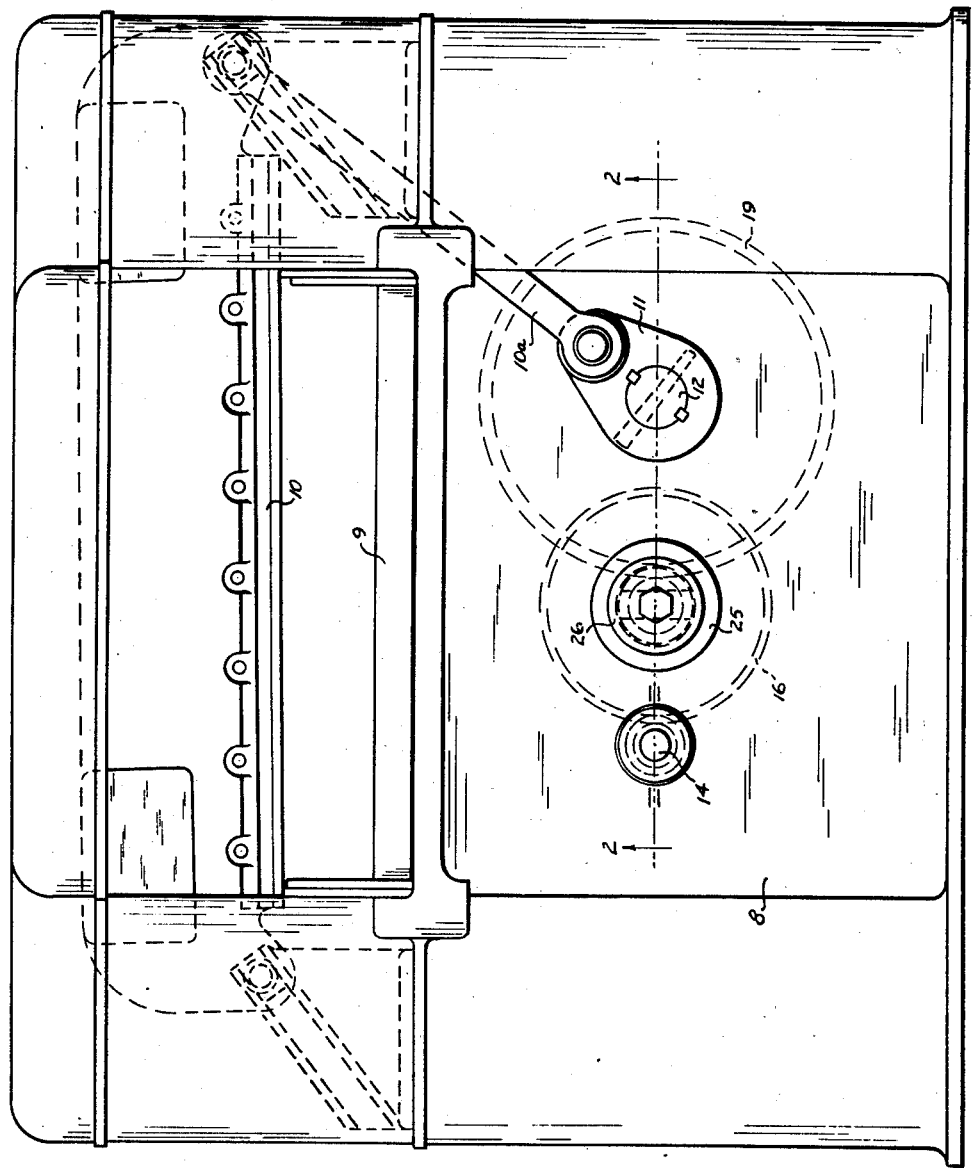
Fig. 1 is a view in front elevation showing the general features of construction of a paper cutting machine incorporating the device of the present invention.

Referring to the drawings, a paper cutting machine is indicated generally in Fig. 1 comprising a main frame portion 8, a table portion 9, above which is mounted the reciprocating knife element 10, the knife being guided for reciprocating movement in a diagonal direction, in accordance with the usual practice. The knife is reciprocated by suitable driving connections shown as comprising a link 10a operatively connected to crank arm 11 which is fastened to drive shaft 12 by suitable keys or pins as is well known in the art.

Power is supplied from a motor or other source not shown, to shaft 13 and is transmitted to the driving pinion 14, through a friction clutch 15 which may be of any type common to machines of this class. The driving pinion 14 meshes with an intermediate gear 16 which is coaxially mounted with the intermediate pinion shaft 17 having gear teeth 18 thereon, meshing with bull-gear 19 suitably keyed to the crank shaft 12.

Interposed between the intermediate gear 16 and the pinion 18 is the load limiting device consisting essentially of a drive member, torque transmitting elements, a breakable element and a driven member.

The drive member consists of a sleeve 20 having a flange portion 21 securely fixed to the intermediate gear 16 by suitable means, such as pins and screws. The opposite end of sleeve 20 is provided with projecting lugs 22, 22 as seen in Fig. 3. These lugs are of the exact width and substantially the same depth as a lug or tenon 23 provided on the small end of shaft 17.

The torque transmitting elements shown in Fig. 4 consist of a pair of segments 24, 24 the outer peripheries of which are encompassed by the annulus or disc-like member 25 which is the breakable or frangible element being made preferably of cast iron or other brittle material. The segments 24, 24 are of such size as to provide a spaced apart relationship equal to the width of the lugs 22, 22 and tenon 23, so that said elements can be assembled in a common transverse plane as shown in Fig. 2. When thus assembled, the chordal faces of the two segments are aligned and in opposing face to face contact with the respective side surfaces of lugs 22, 22 and tenon 23, and are of such dimensions that they are snugly held within the frangible ring 25 without substantial play. The annular ring and segments are of a thickness slightly less than the depth of tenon 23 and lugs 22, 22 so they will not be frictionally engaged or clamped by the retaining washer 26, but merely restrained from axial movement thereby. The washer 26 is provided with mounting bolt 27, which is threaded into shaft tenon 23. Permanently mounted collars 28 and 29 serve to limit axial clearances of the intermediate shaft 17 and sleeve 20, respectively. While sleeve 20 has been shown as the driving, and shaft 17 the driven element, the direction of power transmission may if desired be reversed.

The construction of the load-limiting device is such as to produce a direct tensile stress in the annulus 25 as will be seen by a study of Fig. 5. The torque exerted by the driving member 20 assumed to be rotating in a clockwise direction produces forces F—1 and S—1 on the lugs 22, 22 which in turn are transmitted respectively to an end of the segment members, tending to cause rotation thereof within the interior of ring 25. However the reacting or resisting forces due to the work of the crank results in equal and opposite torque producing forces F—2, S—2 at the corners of the shaft tenon 23 which are also transmitted respectively to the segment members in a direction opposing the rotation thereof with respect to the ring, these latter forces F—2, S—2 being applied somewhat closer to the axis but being correspondingly greater in amount. It is thus evident that the combined forces F—1, F—2 and S—1, S—2 exert substantially equal and opposite resultant forces preventing relative rotation between the segment members and the ring and resolving themselves into forces tending to spread the elements 24, 24 diametrically apart. The pressure of these elements in turn upon the inner periphery of the annulus 25 tends to rupture the latter in case of an overload. It is also evident that the forces on member 25 are substantially confined to the radial plane of the projections 22, 23 such as to place the ring in direct tension at the line of rupture passing through the space between the two segment members. The section of the ring throughout the line of rupture is uniform and hence it is quite simple to determine accurately the necessary size or cross-section of the ring in order to handle a prescribed load and actual breakage has been found to occur uniformly and accurately at the predetermined loads.

Upon rupture of the annulus it flies apart and the two elements 24, 24 drop away so that the sleeve 20 is free to rotate upon shaft 17 which is to say the drive pinion 14 and intermediate gear 16 have been completely disconnected from the intermediate pinion 18 and crank gear 19. The complete severance of driving connection insures that none of the various working parts is disfigured or damaged while the motion of the drive is being arrested and that no objectionable noise occurs as the drive continues. In such an event, the operator first determines the cause of overload and rectifies it; he then realigns the shaft tenon 23 with the lugs 22, replaces the segment elements 24, 24 and provides a new annulus 25 after temporary removing the retaining washer 26.

In the modified form of the invention shown in Figs. 6 and 7, it will be seen that the disc shaped member 25a is an integral combination of the elements 24, 24 and the annulus 25. The disc 25a is provided with a slot 30 which fits over the sleeve lugs 22, 22 and the shaft tenon 23a. The latter is provided with recessed slots 31 in which are secured flat cantilever type springs 32 which function as retainers against axial movements of the disc 25a. Under overload, disc 25a tends to split apart in the plane of the parts 22 and 23a, due to substantially equal and opposite forces at 90° therefrom. As in the form above described, the ring is confined to the radial plane of the elements 22, 23a and in the line of rupture which occurs at opposite ends of the slot, the section of the ring is uniform, free of stress-risers, and is subject practically entirely to direct tension. It is to be noted in this construction that no tools are required for replacing the frangible element, the operator only being required to align the lugs and tenon, whereupon a new frangible element is slipped into place.

The present invention has particular application in connection with the drive for a paper cutter. In such device substantial loads are involved in normal operation, i. e., when the knife strikes the paper and begins its cutting operation therethrough. Further this normal load may increase very materially under certain conditions such as where the cutting knife has become dull in use causing the necessary driving load to be doubled or even further increased. It is therefore quite important that the overload release device provide for transmitting the full or maximum operating load, and yet provide for disconnecting the power source upon a relatively small increase over that maximum or limiting value. The present device performs satisfactorily under these conditions and provides for continuous safe operation as long as the apparatus is functioning normally, and for a quick free break at a predetermined point when normal loads are exceeded. The accuracy with which this fracture point can be predetermined provides assurance against damage to other parts of the machine which need not be built with excessive strength to withstand these emergency release conditions. As a safety device for the operator's protection in such paper cutting machines, it is customary to provide a positive stop which is automatically interposed directly in the path of travel of the knife operating mechanism immediately after the knife has performed a complete cycle of operation. This positive stop is retracted at the start of the cutting cycle by the clutch throw-in mechanism commonly used, but if for any reason it should remain interposed, then the present invention provides a construction which will effect disconnection of the drive, protecting the gearing and associated parts against damage.

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:

1. A load limiting device comprising a driving tube formed with projecting lugs at one end thereof, a driven shaft having a tenon thereon, a pair of segments having chordal surfaces normally aligning said lugs and tenon, a frangible annular ring circumscribing the peripheral surfaces of said segments, and a retaining disc removably affixed to said shaft tenon.

2. A load limiting device of the character described comprising a rotatable driving member having a projecting lug at one end thereof, a rotatable driven member also having a lug at one end thereof, a pair of segments having their chordal surfaces in alignment with said lugs, a frangible annulus surrounding said segments and lugs and confining the same against relative angular movement and means to retain said annulus and segments against axial movement.

3. A load limiting device comprising in combination a driving element, a driven element, said driving and driven elements having end portions with outwardly depending members, a pair of segments normally positioning said depending members in alignment, frangible means for radially confining said segments in normal position, and means for preventing axial movement of said segments and frangible confining means.

4. In a load limiting device, the combination of driving and driven rotary elements, means projecting from each of said elements in a common plane normal to the axis of rotation but at different radial distances from said axis, means cooperating with said projecting means for transmitting torque between said elements up to a predetermined value including parts engaging said projecting means, and an outer frangible part subject to stress in tension under load and located radially outwardly of and enclosing said projecting means and said engaging means.

5. In a load limiting device, the combination of coaxial driving and driven elements located between two planes normal to the axis of rotation and at different distances from the axis to be freely rotatable with respect to each other, and frangible interconnecting means for transmitting normal driving loads between said elements and adapted to rupture under abnormal load including a disc-like part having an operture extending axially therethrough for internally receiving and enclosing said driving and driven elements, said frangible interconnecting means also including parts enclosed within the outer periphery of said disc-like part and extending in contact with both said driving and said driven elements for preventing relative rotation therebetween, said disc-like part having an outer section radially beyond said aperture subject to direct stress in tension under load.

6. An overload release device comprising a driving tube having lugs extending from one end thereof, a driven shaft having a tenon, a frangible torque transmitting disc-like member having an elongated aperture therein terminating radially inwardly of the outer periphery of said member leaving an outer frangible section, said lugs and tenon being received and retained in aligned driving relation within said aperture.

7. An overload release device comprising in combination a rotatable driving element, a rotatable driven element, said driving and driven elements having end portions with outwardly extending members located in corresponding overlapping relation but at different radial distances from the axis to be freely rotatable with respect to each other, frangible means for transmitting up to a predetermined torque between said members including a disc-like part having an internal aperture extending axially therethrough for receiving said driving and driven elements, said disc-like part having torque transmitting portions for aligning said elements and preventing relative rotation therebetween, and an outer section radially beyond said aperture subject to direct stress in tension under load transmitted through said torque transmitting portions.

8. A load limiting device for use in the drive for a paper cutting machine adapted to transmit drive forces up to a normal predetermined maximum and to then completely release without additional contact with the driving parts, comprising coaxial rotating driving and driven elements located within common planes normal to the axis of rotation and at different radial positions, means for transmitting up to a predetermined load between said elements including means for engaging both said elements and preventing relative rotation thereof, the load on said elements tending to spread said engaging means, said load transmitting means having a frangible portion of uniform cross section within said planes radially outwardly of said engaging means for restraining said elements against relative rotation and adapted to rupture when the tensile stress in said section exceeds a predetermined desired value.

9. A load limiting device of the character described comprising coaxial driving and driven elements each having an axial projection at adjacent ends thereof, said projections being freely rotatable with respect to each other, and means for normally transmitting driving loads between said elements and causing said elements to rotate together including a disc-like structure received over the ends of said driving and driven elements and receiving said projections internally thereof, said disc-like structure having a frangible outer peripheral part subject to direct tension under load and having parts within said frangible peripheral portion and restrained thereby for engaging both said projections to transmit driving forces between said elements causing said elements to rotate together up to the point where the driving load develops a tension stress within said frangible peripheral part sufficient to cause rupture thereof.

10. A load limiting device comprising in combination a driving element, a driven element, said elements being coaxial and freely rotatable with respect to each other and having members projecting from an end thereof and located between two planes normal to the axis of rotation, and frangible means having an outer peripheral frangible portion, said portion being located radially outwardly of said projecting members and between said planes, said frangible means including means for driving the driven element from the driving element and to exert a breaking stress on the frangible element.

WILLIAM R. SPILLER.